United States Patent [19]

Suzaki et al.

[11] Patent Number: 4,683,478

[45] Date of Patent: Jul. 28, 1987

[54] PRINTER WITH DETACHABLY MOUNTABLE INK RIBBON CASSETTE

[75] Inventors: Masayuki Suzaki, Fujisawa; Shoji Nishiwaki, Machida; Toshitaka Hayashima, Yamato; Kazuo Uezu, Hadano; Hidejirou Maehara, Yokohama; Masanori Momose, Hiratsuka, all of Japan

[73] Assignee: Ricoh Company, Ltd., Tokyo, Japan

[21] Appl. No.: 803,503

[22] Filed: Nov. 29, 1985

Related U.S. Application Data

[62] Division of Ser. No. 631,603, Jul. 17, 1984.

[30] Foreign Application Priority Data

| | | | |
|---|---|---|---|
| Jul. 23, 1983 | [JP] | Japan | 58-134861 |
| Jul. 23, 1983 | [JP] | Japan | 58-134862 |
| Jul. 29, 1983 | [JP] | Japan | 58-138942 |
| Oct. 19, 1983 | [JP] | Japan | 58-195496 |

[51] Int. Cl.[4] .............................................. G01J 15/10

[52] U.S. Cl. .............................. 346/76 PH; 340/105; 400/233

[58] Field of Search ................ 346/76 R, 76 PH, 105, 346/106, 139 R; 400/207, 208, 208.1, 693.1, 694, 120, 224, 229, 233, 234, 283; 219/216 PH; 242/58; 226/153, 192

[56] References Cited

U.S. PATENT DOCUMENTS 4,437,778 3/1984 Miyashita et al. .................. 400/208

FOREIGN PATENT DOCUMENTS 0148682 9/1982 Japan ............................. 346/76 PH 2114954 9/1985 United Kingdom ........... 346/76 PH

*Primary Examiner*—Arthur G. Evans

*Attorney, Agent, or Firm*—Cooper, Dunham, Griffin & Moran

[57] ABSTRACT

A printer system using a cassette housing therein printing ribbon is provided. In accordance with one aspect of the present invention, there is provided a cassette provided with an electrically conductive sheet for preventing the cassette from accumulating charge. In accordance with another aspect of the present invention, there is provided a thermal printing process in which a heat-sensitive ink ribbon is separated away from a recording medium while the ink is still half-melted thereby allowing to prevent a printed image from becoming reflective. In accordance with a further aspect of the present invention, there is provided a printer system in which a printing ribbon is extended as inclined with respect to a recording medium such that the printing ribbon is separated farther away from the recording medium in a printing direction. In accordance with a still further aspect of the present invention, there is provided a thermal printer system which can set a desired mode of printing operation, depending on with or without using printing ribbon, automatically by detecting the presence or absence of the printing ribbon in position.

23 Claims, 21 Drawing Figures

PRINTER WITH DETACHABLY MOUNTABLE INK RIBBON CASSETTE

This is a division of application Ser. No. 631,603, filed July 17, 1984.

BACKGROUND OF THE INVENTION

1. Field of the Invention

This invention generally relates to printing machines, such as printers and typewriters, and particularly to printers and typewriters on which an ink ribbon cassette may be detachably mounted.

2. Description of the Prior Art

In a printing machine in which an ink ribbon cassette housing therein ink ribbon is detachably mounted for carrying out a printing operation using the ink ribbon supplied from the cassette, the ink ribbon becomes charged due to frictional contact with such elements as ribbon cassette, ribbon feeding belt, ribbon guide and ribbon guide roller as it travels during printing. The ink ribbon thus charged tends to hinder normal printing operation because, for example, it is attracted toward a sheet of recording paper or there occurs an electrostatic breakdown due to the charge accumulated on the cassette, which then could cause malfunctioning on the part of printer.

For this reason, in a prior art printer system using such a detachably mountable ink ribbon cassette 4, use is, for example, made of a feed roller 1 comprised of an electrically conductive material, as shown in FIG. 1. FIG. 2 schematically shows the condition in which the cassette 4 of FIG. 1 is mounted in position for printing operation. As shown, there is provided a ribbon feed motor 2 which is operatively coupled to the feed roller 1 of cassette 4 through a driving shaft 3. In this structure, the driving shaft 3 must also be comprised of an electrically conductive material thereby allowing the electrostatic charge accumulated in the cassette 4 to be discharged to the exterior.

SUMMARY OF THE INVENTION

It is therefore a primary object of the present invention to obviate the disadvantages of the prior art as described above and to provide improvements in a printer system using a detachably mountable ink ribbon cassette.

Another object of the present invention is to provide an improved ink ribbon cassette which may be detachably mounted in a printing system for use in printing operation.

A further object of the present invention is to provide an improved ink ribbon cassette which is prevented from accumulating electrostatic charge thereon.

A still further object of the present invention is to provide an improved ink-transfer type printing system using a heat-sensitive ink ribbon which transfers ink selectively to recording paper when heated by a thermal printhead.

A still further object of the present invention is to provide an improved ink ribbon cassette which may be detachably mounted on a printing machine and which is capable of keeping the ink ribbon in tension properly during printing operation.

A still further object of the present invention is to provide an improved ink ribbon cassette capable of preventing the ink ribbon from being slacked during printing operation when detachably mounted in a printing machine.

A still further object of the present invention is to provide an improved ink ribbon cassette which can be easily mounted on or detached from a printing machine.

A still further object of the present invention is to provide an improved printing machine capable of carrying out printing either with or without ink ribbon depending on the kind of recording paper used.

A still further object of the present invention is to provide an improved printing machine simple in structure and easy to operate.

Other objects, advantages and novel features of the present invention will become apparent from the following detailed description of the invention when considered in conjunction with the accompanying drawings.

DESCRIPTION OF THE PREFERRED EMBODIMENTS

Figure 1:
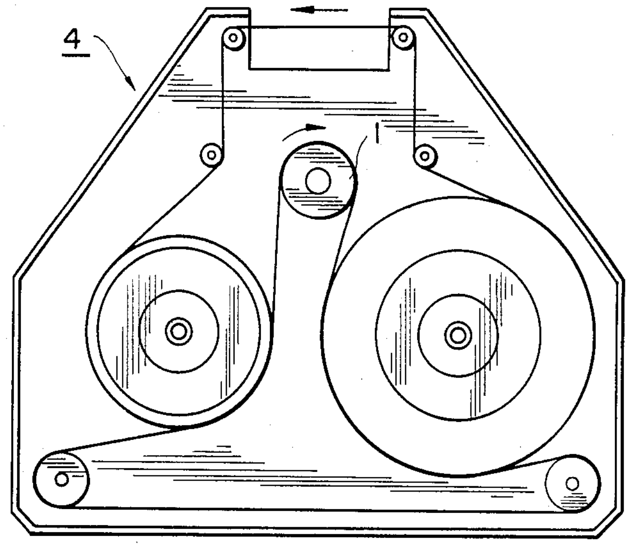
Fig. 1 Prior Art
FIG. 1 is a plan view schematically showing the internal structure of a typical prior art ink ribbon cassette.
Figure 2:
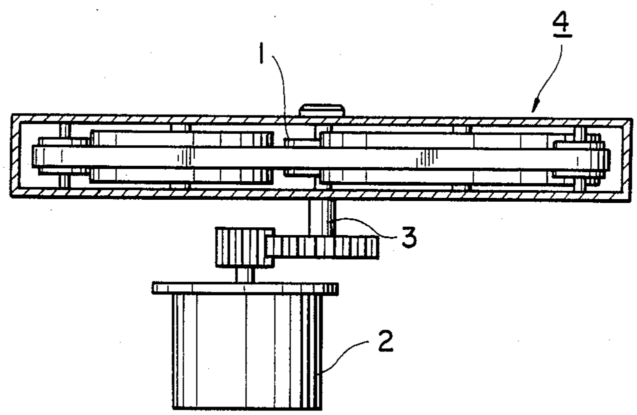
Fig. 2 Prior Art
FIG. 2 is a cross-sectional view showing the condition in which the ink ribbon cassette of FIG. 1 is mounted in position for printing operation.
Figure 3:
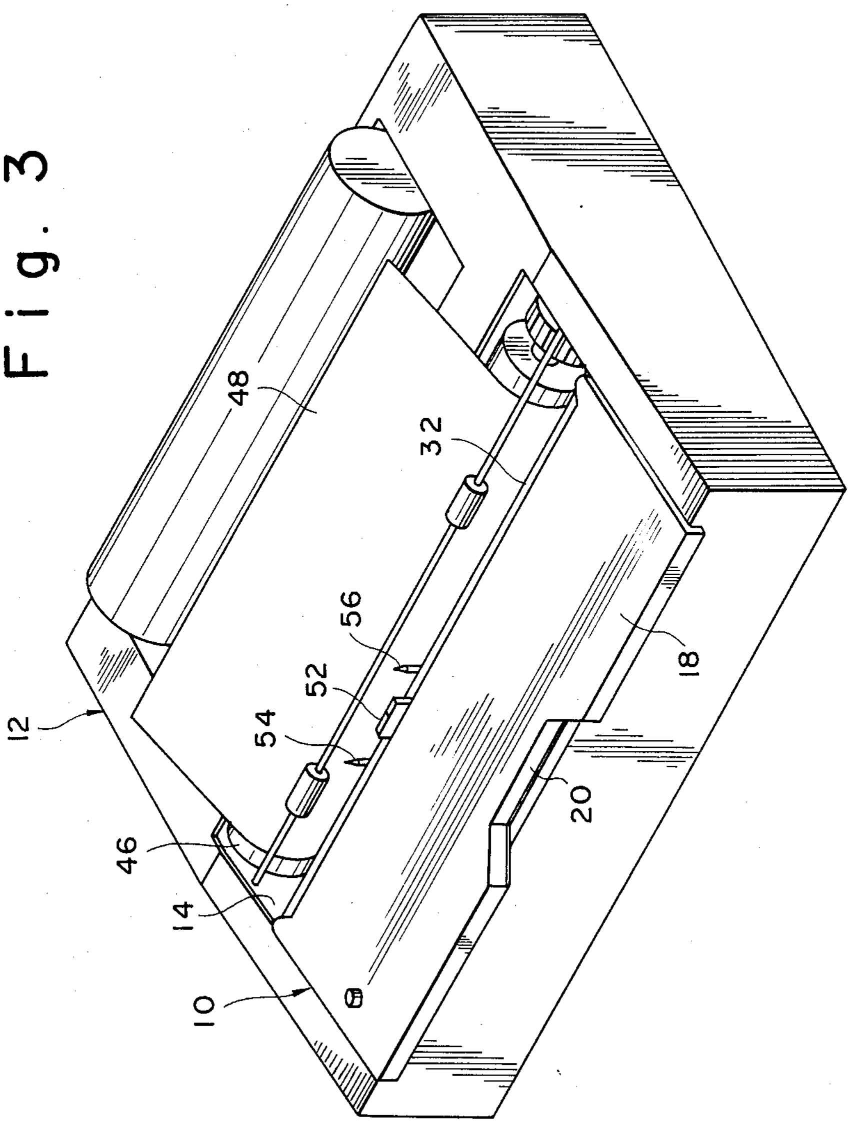
FIG. 3 is a perspective view showing the overall structure of a thermal printer having detachably mounted thereon an ink ribbon cassette 10 constructed in accordance with one embodiment of the present invention.
Figure 4:
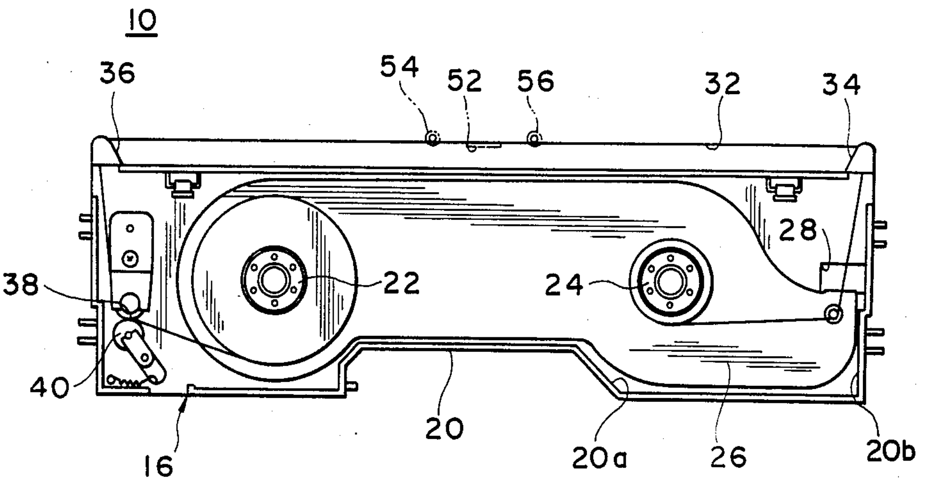
FIG. 4 is a plan view showing the internal structure of the ink ribbon cassette 10 with its top cover removed.
Figure 5:
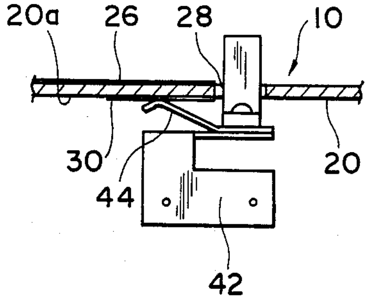
FIG. 5 is a schematic illustration showing on an enlarged scale part of the cassette 10 when detachably mounted in position.

Referring now to FIG. 3, there is shown a thermal printer having a printer main body 12 on which is detachably mounted an ink ribbon cassette 10 constructed in accordance with one embodiment of the present invention. The printer main body 12 includes a frame 14 which holds the ink ribbon cassette 10 in position when mounted As shown in FIGS. 3-5, the cassette 10 includes a bottom case 20 in the shape of a tray and a top cover 18 which may be placed on the bottom case 20 for closure. As shown in FIG. 4, the bottom case 20 is provided with a take-up spool 22 and a supply spool 24 as spaced apart from each other and rotatable.

According to a feature of the present invention, a thin sheet 26 of electrically conductive material, such as a mixture of polyethylene and carbon powder, is placed on the inner surface of a bottom wall 20*a* of this bottom case 20. This conductive sheet 26 is provided with a pair of holes corresponding in position and size to the take-up and supply spools 22 and 24. As shown in FIGS. 4 and 5, at one end of the sheet 26 is integrally formed an elongated section which is lead out as bent through a ribbon end detecting opening 28 provided in the vicinity of a right-hand side wall 20*b* of bottom case 20. A lead-out portion 30 of the elongated section of the conductive sheet 26 is fixedly attached to an outer surface of bottom wall 20*a*.

A supply of ink ribbon 32 is originally stored as wound around the supply spool 24. The ink ribbon 32 unwound from the supply spool 24 is lead to the exterior of the cassette 10 through a supply port 34 and it is again wound around the take-up spool 22 after having been lead into the interior of the cassette 10 through a take-up port 36. It is to be noted that a feed roller 38 and a pinch roller 40 biased against the feed roller 38 are provided between the take-up port 36 and the take-up spool 22 and the ink ribbon 32 advances between these rollers 38 and 40 as pinched therebetween. When the cassette 10 is set in position, the feed roller 38 comes to be operatively coupled to a ribbon feed motor fixedly provided in the printer main body 12. Thus, when the take-up spool 22 is driven to rotate by the ribbon feed motor, the ink ribbon 32 is unwound from the supply spool 24 and wound around the take-up spool 22.

As shown in FIG. 5, an electrically conductive bracket 42 is fixedly attached to the frame 14 and an electrically conductive leaf spring 44 is fixedly mounted on the bracket 42. Thus, when the cassette 10 is detachably mounted in position as shown in FIG. 3, a free end of the leaf spring 44 comes into contact with the lead-out portion 30 of conductive sheet 26. Since the frame 14 is also comprised of an electrically conductive material and is connected to ground, the conductive sheet 26 is also connected to ground when the cassette 10 is set in position. As a result, the electrostatic charge produced on the ink ribbon 32 and/or in the cassette 10 can escape to the exterior or to the ground.

Figure 6:
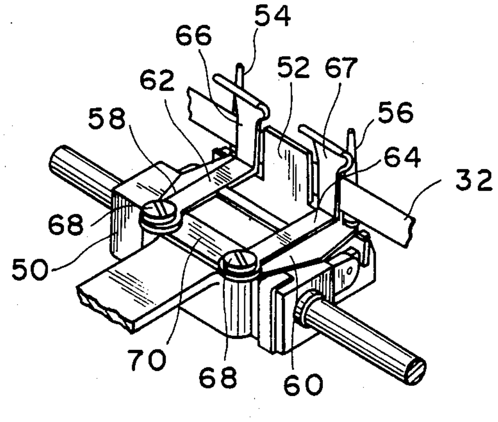
FIG. 6 is a perspective view showing the carriage carrying thereon a thermal printhead provided in the printer of FIG. 3.

As well known in the art, a carriage 50 carrying thereon a thermal printhead 52 as shown in FIG. 6 is provided to be movable in a reciprocating manner along a platen 46 around which a sheet 48 of recording paper is placed. As shown in FIG. 6, the carriage 50 is also provided with a pair of pin-shaped ribbon guides 54 and 56 which are disposed on both sides of the thermal printhead 52. Thus, when the ink ribbon cassette 10 is set in position, the lead-out portion of the ink ribbon 32 is inserted between the printhead 52 and the pair of ribbon guides 54 and 56 as shown in FIG. 6. These ribbon guides 54 and 56 are comprised of an electrically conductive material, such as stainless steel and provided as fixedly attached upright at free ends of movable arms 58 and 60 which are similarly comprised of an electrically conductive material and mounted on the carriage 50 to be pivotal horizontally.

Superposingly provided on the movable arms 58 and 60 are generally L-shaped auxiliary guide members 62 and 64, respectively, whose upstanding portions 66 and 67 gradually increase in width toward the top and slightly curved in the direction away from the platen 46 thereby allowing the ribbon 32 to be inserted between the thermal printhead 52 and the ribbon guides 54 and 56 with ease. The movable arms 58 and 60 and the auxiliary guide members 62 and 64 are pivotally supported on the carriage 50 by means of screws 68 and 68 so that the arms 58 and 60 and guide members 62 and 64 may be pivotally moved around the respective screws 68 and 68. Also provided on the carriage 50 as extending between the screws 68 and 68 is an electrically conductive connector 70 which is connected to ground through a flexible print plate (not shown) which in turn is connected to an electronic circuit unit fixedly provided on the frame 14. With this structure, even if electrostatic charge is produced on that portion of ink ribbon 32 which is lead out of the cassette 10 through the supply port 34, the charge can be dumped to the ground via a path defined by the ribbon guides 54 and 56, movable arms 58 and 60, connector 70, flexible print plate and frame 14.

The above-described embodiment is the case in which the present invention is applied to a thermal printer. It should be noted, however, that the present invention is not limited only to this and it may be applied to other printers and typewriters of the type in which an ink ribbon cassette is detachably mounted. In addition, in the above-described embodiment, the ribbon cassette 10 is detachably mounted on the frame 14 of the print main body 12. However, the present invention may also be applied to printers and typewriters of the type in which the ink ribbon cassette is detachably mounted on a carriage which moves reciprocatingly along a platen. It should further be noted that the ink ribbon 32 may be of any desired kind, such as heat-sensitive type and non-heat-sensitive type. Besides, in the above-described embodiment, use was made of conductive sheet 26 placed on the bottom case 20 for preventing the cassette 10 from accumulating electrostatic charge. Alternatively, a metal foil such as a copper foil may also be provided on the bottom case 20, or an electrically conductive paint may be provided on the bottom case 20, if desired. Such an electrically conductive material may also be provided on the inner surface of the top cover 18 or any other desired portion of the cassette 10 for leading the charge produced inside of the cassette 10 to the exterior thereof.

In the illustrated embodiment, the leaf spring 44 was used to establish an electrical connection between the conductive sheet 26 and ground when the cassette 10 is set in mounting position. However, any other element having resilience and electrical conductivity, such as coil spring, may also be used. Moreover, the ribbon guides 54 and 56 of the above-described embodiment were pin-shaped; however, use may also be made of ribbon guides having other shapes, such as plate shape. Furthermore, use was made of connector 70 in the illustrated embodiment; however, it may also be so structured to have the ribbon guides 54 and 56 connected to ground by providing other electrically conductive elements between the guides 54, 56 and the frame 14.

In accordance with another aspect of the present invention, there is provided an improved ink transfer type thermal printing system in which a heat-sensitive ink ribbon is selectively heated by a thermal printhead to have the ink selectively transferred to a sheet of recording paper placed around a platen to effect printing.

Figure 7:
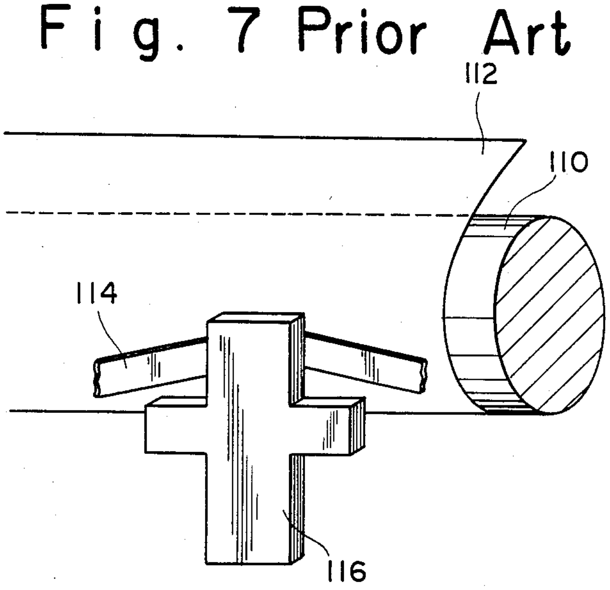
Fig. 7 Prior Art
FIG. 7 is a schematic illustration showing the arrangement of a typical prior art ink transfer type thermal printing system in which printing is carried out using a thermal printhead.
Figure 8:
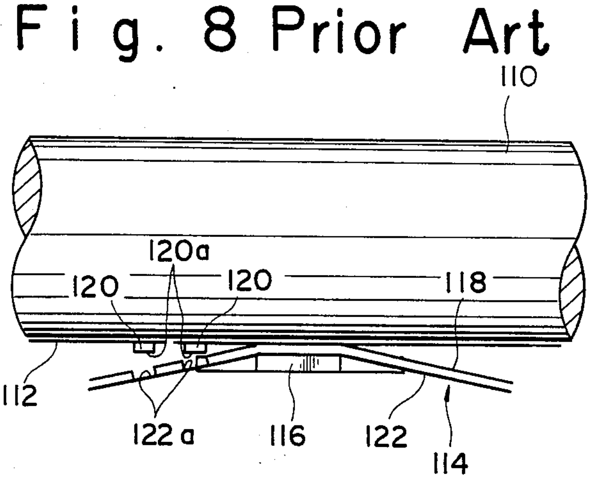
Fig. 8 Prior Art
FIG. 8 is a schematic illustration showing how printing is effected by having ink transferred selectively from a heat-sensitive ink ribbon in the prior art printing systm.

FIG. 7 schematically illustrates a typical prior art thermal printer, in which around a platen roller 110 is placed a recording sheet 112 and a heat-sensitive ink ribbon 114 is placed between the recording sheet 112 and a thermal printhead 116, which has its printing surface, on which a plurality of heat-producing elements are arranged in the form of matrix as well known in the art, directed against the platen roller 110 and which may be moved closer to or separated away from the platen roller 110. The thermal printhead 116 is moved along the platen roller 110 while being pressed against the platen roller 110 with the ink ribbon 114 sandwiched between the thermal printhead 116 and the recording sheet 112, during which the matrix of heat-producing elements are selectively activated in accordance with an image signal to be printed so that the ink on the ink ribbon 114 is selectively transferred to the recording sheet 112 to effect printing thereon, as shown in FIG. 8. That is, the heat-sensitive ink ribbon 114 includes an ink layer 118 and a base 122 for supporting thereon the ink layer 118, and the ink layer 118 is selectively transferred to the recording sheet 112 when heated by the thermal printhead 116 as indicated by transferred ink portions 120.

However, in such a case, since the base 122 of heat-sensitive ink ribbon 144 has an extremely smooth surface, the transferred ink portion 120 also has an outer surface 120*a* which is quite smooth and reflective. Because of this, a recorded image formed by these ink portions 120 transferred to the recording sheet 112 tends to be reflective and it is rather difficult to see. Under the circumstances, it has been proposed to make the surface of base 122 roughened by having it treated with chemicals thereby eliminating the reflectivity from the surface 120*a* of transferred ink portion 120. This might allow to prevent the printed image from becoming reflective, but there are various disadvantages such as high cost. Moreover, in such a prior art transfer type thermal print system, it is so structured that the ink ribbon 114 is separated away from the recording sheet 112 when the ink layer 118 hardens after having been once melted due to application of heat from the thermal printhead 116. For this reason, there is produced a relatively large sound when the ink ribbon 114 is separated away from the recording sheet 112.

Figure 9:
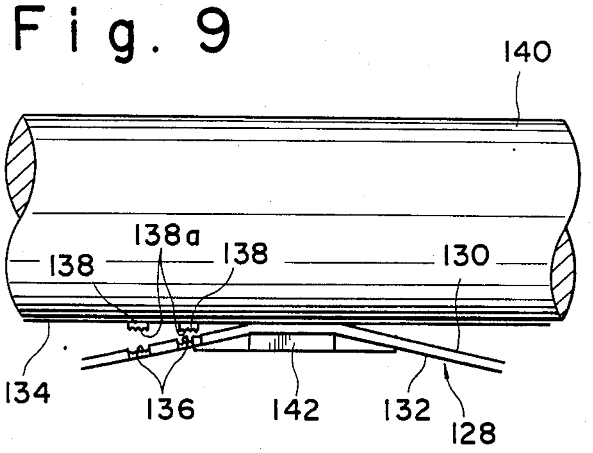
FIG. 9 is a schematic illustration showing how printing is effected in, accordance with an embodiment of the present invention.

In accordance with this aspect of the present invention, there is provided an ink transfer type thermal print system which is so structured that the ink ribbon is separated away from the recording sheet while the ink layer is still in the half-melted condition. In order to attain this objective, in accordance with one embodiment of this aspect of this invention, the level of heat to be applied to the ink ribbon is increased as compared with the prior art. With this structure, it is insured that the ink layer remains still half-melted when the ink ribbon is separated away from the recording sheet. Thus, as shown in FIG. 9, when an ink layer 130 of heat-sensitive ink ribbon 128 is to be selectively transferred to a recording sheet 134 as separated away from a base 132 of the ink ribbon 128 to carry out a printing operation, a portion of the ink layer 130 is not transferred to the recording sheet 134 completely but it is only partly transferred to the recording sheet 134 as indicated at 138 with the remaining part 136 left as attached to the base 132. In this case, the transferred portion 138 has a surface 138*a* which is irregular and not smooth. Thus, the surface 138*a* and therefore a printed image is not reflective. It is to be noted that in FIG. 9, 140 indicates a platen roller and 142 indicates a thermal printhead.

In accordance with another embodiment of this aspect of this invention, it is so structured to shorten a time period between application of heat to the heat-sensitive ink ribbon and separation of the ink ribbon from the recording sheet. This may be envisaged in various manners. For example, the carriage carrying thereon the thermal printhead 142 may be moved at an increased speed thereby shortening the time period between application of heat by the thermal printhead 142 and separation of the ink ribbon 128 from the recording sheet 134. In this case also, the ink layer 130 is not completely transferred to the recording sheet 134 but it is only partly transferred thereby permitting to obtain irregularity at the surface 138*a* of transferred ink portion 138, as described with respect to the previous embodiment.

In accordance with a further embodiment of this aspect of this invention, it is so structured that the angle of separation formed between the ink ribbon 128 and the recording sheet 134 is changed to allow only part of the ink layer 130 to be transferred to the recording sheet 134. For example, if such a separation angle is made larger, i.e., that portion of the ink ribbon 128 which separates from the recording sheet 134 being moved away from the recording sheet 134 more rapidly, the ink layer 130 is allowed to be transferred only partly so that the transferred portion 138 will have an irregular and thus non-reflective surface 138*a*.

As described above, in accordance with this aspect of the present invention, since the ink layer 130 of heat-sensitive ink ribbon 128 is allowed to be transferred only partly, the transferred ink portions 138 have irregular surfaces 138*a* and thus the printed image formed by the transferred ink portions 138 is not reflective and improved in visibility. Furthermore, since the ink ribbon 128 is separated from the recording sheet 134 while the ink layer 130 is still half-melted due to application of heat by the thermal printhead 142, the level of noise produced when the ink ribbon 128 is separated from the recording sheet 134 is significantly reduced.

Figure 10:
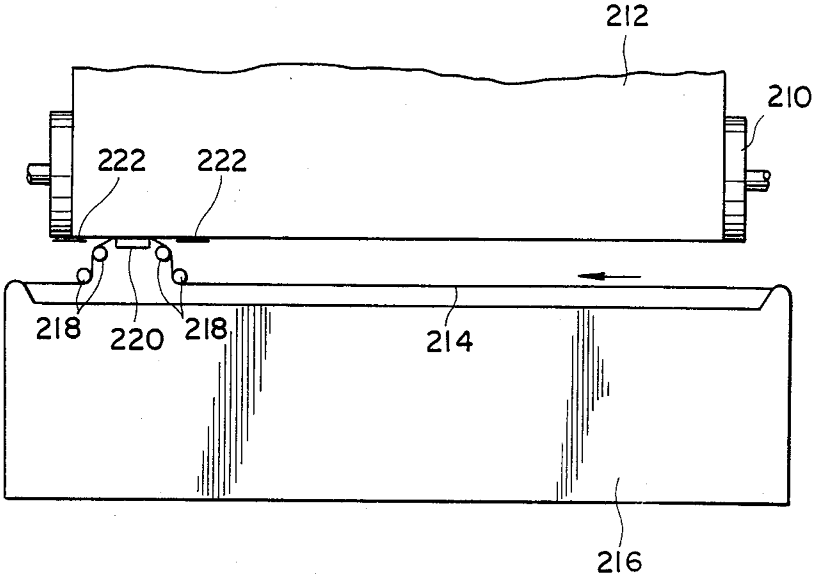
Fig. 10 Prior Art
FIG. 10 is a schematic illustration showing the condition in which a typical prior art ink ribbon cassette 216 is mounted in position opposite to a platen roller 210.

Now, a further aspect of the present invention will be described with reference to FIGS. 10-16. This aspect of the present invention is concerned with a printing system in which an ink ribbon is extended along a platen around which a recording sheet is placed and a carriage carrying thereon printing mechanism, such as a thermal printhead in the case of a thermal printer, is moved along the platen in a reciprocating manner, whereby the ink ribbon is held stationary while the carriage moves in a forward direction during which printing is carried out on the recording sheet using the ink ribbon and the printing mechanism and, when the carriage moves in a backward direction which is opposite to the forward direction to its initial position, the ink ribbon is advanced over a predetermined length along with the returning movement of the carriage. Such a prior art printing system is illustrated in FIG. 10. As shown, the system includes a platen roller 210 around which a recording sheet 212 is placed. In the illustrated embodiment, along the platen roller 210 is extended an ink ribbon 214, which is lead out of an ink ribbon cassette 216 at its right end and lead into the cassette 216 at its left end. The ink ribbon 214 lead out of the cassette 216 is passed around a plurality of guide rollers 218 provided on a carriage (not shown) and guided between a thermal printhead 220 and the recording sheet 212. It is to be noted that the carriage is provided to be reciprocatingly movable along the platen 210, and when it moves in a forward direction, i.e., from left to right in FIG. 10, printing is effected on the recording sheet 212 using the thermal printhead 220 and the ink ribbon 214. While the carriage moves in the forward direction, the ink ribbon 214 remains stationary. On the other hand, when the carriage moves in the backward direction, i.e., from right to left, after reaching the right end of travel, the ink ribbon 214 is advanced in the direction indicated by the arrow together with the returning motion of carriage so that the ink ribbon 214 is advanced over the length of a single print line.

In the illustrated prior art printing system, however, the ink ribbon 214 extends in parallel with the platen roller 210. Thus, if the ink ribbon 214 becomes slacked while the carriage moves in the forward direction, such a slack remains and could cause the printing quality to be deteriorated. Moreover, paper guides 222 for guiding the recording sheet 212 when it is placed around the platen roller 210 are mounted on the carriage, and the carriage is normally located at the left end of travel or print start position, as shown in FIG. 10, when the recording sheet 212 is set in position. Under the condition, when the recording sheet 212 is set in position around the platen roller 210, the right-hand portion of the recording sheet 212 which is located farther away from the carriage tends to move away from the platen roller 210. Thus, as the recording sheet 212 is inserted, there is a chance that its leading edge becomes engaged with the ink ribbon 214 at its right-hand portion. In the illustrated printing system, the gap between the ink ribbon 214 and the platen 210 is relatively large; however, the ink ribbon 214 is often times located much closer to the platen roller 210, in which case the problem of engagement between the recording sheet 212 being inserted and the ink ribbon 214 becomes more critical.

Figure 11:
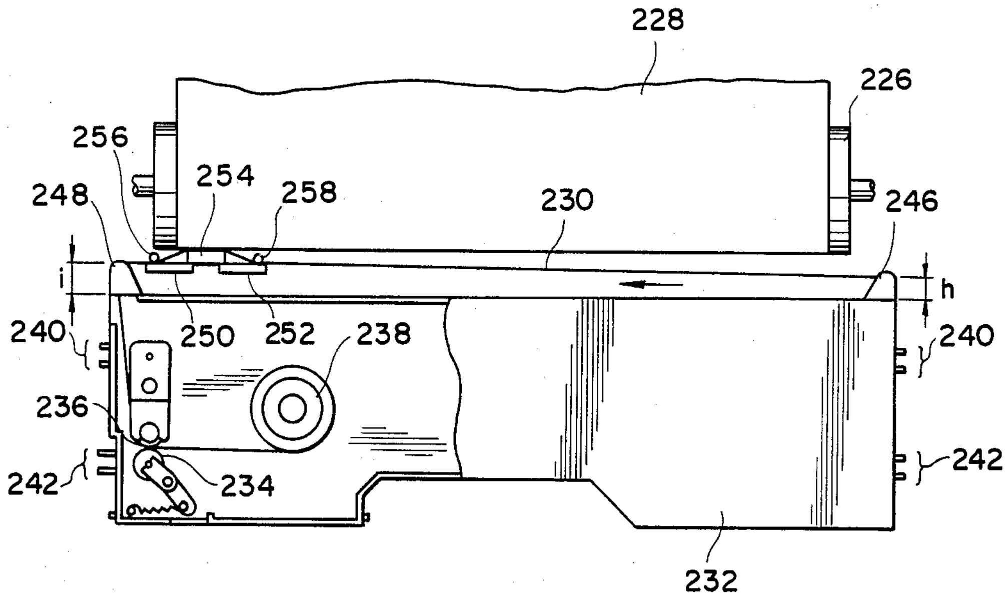
FIG. 11 is a schematic illustration showing the condition in which an ink ribbon cassette 232 embodying the present invention is mounted in position in a printer system.

FIG. 11 shows a printing system constructed in accordance with one embodiment of this aspect of the present invention. As shown in FIG. 11, there is provided a platen roller 226 which corresponds to the platen roller 210 in FIG. 10. It is to be noted that the platen roller 226 is employed in the illustrated embodiment; however, any other type of platen, such as rectangular type or plate type platen, may also be used. Around the platen roller 228 is set a recording sheet 228 which may be a cut sheet of paper or a continuous sheet of roll paper with or without sprocket holes. An ink ribbon 230 is extended across the recording sheet 228 set around the platen roller 226, and similarly with FIG. 10, the ink ribbon 230 is lead out of an ink ribbon cassette 232 at its right end and lead into the cassette 232 at its left end. Inside the cassette 232 is provided a feed roller 236 against which a pinch roller 234 is biased, and the ink ribbon 230 after having been lead into the cassette 232 passes between the feed and pinch rollers 234 and 236 as pinched therebetween and is wound around a take-up spool 238.

Figure 12:
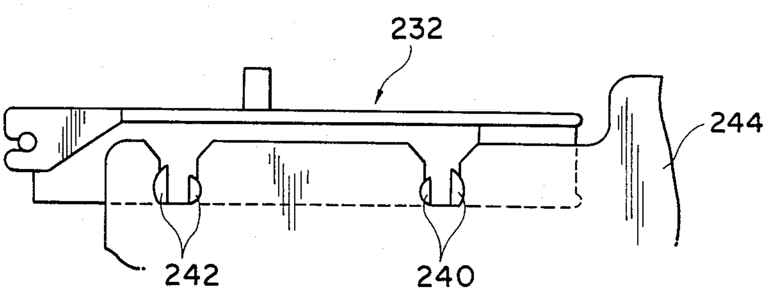
FIG. 12 is a schematic illustration showing how the cassette 232 is detachably mounted in position on a frame of printer.

Although not shown specifically, the feed roller 236 becomes operatively coupled to a ribbon feed motor, which is fixedly mounted on a frame (not shown) of the printer system, when the cassette 232 is set in position so that the ribbon 230 travels in the direction indicated by the arrow. As well known in the art, there is provided a structure for the feed roller 236 to be prevented from being rotated in the reverse direction. On either side of the cassette 232 is provided two pairs of engaging projections 240 and 242 as spaced apart from each other. As best shown in FIG. 12, each of the engaging projections is semi-circular in cross section, and these engaging projections 240 and 242 are fitted into notches formed on top of a machine frame 244 when the cassette 232 is set in position. Thus, when set in position, the cassette 232 is maintained horizontally and in parallel with the platen roller 226.

As shown in FIG. 11, the cassette 232 is also provided at its end surface facing the platen roller 226 with a supply projection 246 at the right end and a take-up projection 248 at the left end. The ink ribbon 230 is thus lead out of the cassette 232 from the tip end of the supply projection 246 and lead into the cassette 232 through the tip end of the take-up projection 248. The heights of the supply and take-up projections 246 and 248 are indicated by h and i, respectively. Of importance, in accordance with the present invention, it is so structured that the height i of take-up projection 248 is larger than the height h of supply projection 246. As a result, the ink ribbon 230 extending between the two projections 246 and 248 is inclined with respect to the platen roller 226 such that it is separated farther away from the platen roller 226 from left to right in FIG. 11.

Figure 13:
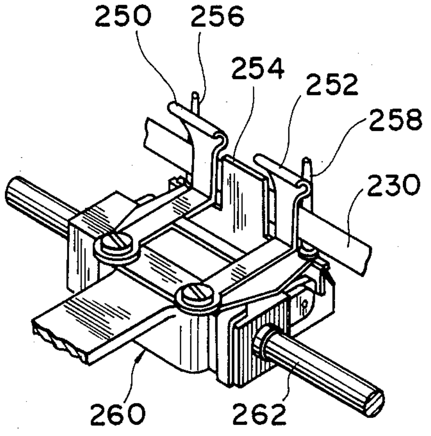
FIG. 13 is a perspective view showing a carriage 260 carrying thereon a thermal printhead 254 provided in the printer system of FIG. 11.

In the illustrated example, the ink ribbon 230 extending between the two projections 246 and 248 is guided by a pair of guide members 250 and 252 and passed between a thermal printhead 254 and a pair of guide shafts 256 and 258 disposed on both sides of the printhead 254. During printing, the thermal printhead 254 is pressed against the platen roller 226 to keep the ink ribbon 230 in contact with the recording sheet 228. As shown in FIG. 13, the thermal printhead 254, guide shafts 256 and 258, and guide members 250 and 252 are all provided on a carriage 260 which is supported to be slidably movable along a guide rod 262 which in turn is provided to extend in parallel with the platen roller 226. That is, the illustrated example is a thermal printer system and thus the thermal printhead 254 is provided as a printing mechanism. It is to be noted however that the present invention should not be limited only to the thermal printer system and it is equally applicable to any other type of printer system, such as an impact printer and a reaction type printer in which printing is effected through a reaction between a chemical coated on a recording sheet and another chemical provided on an ink ribbon. Alternatives to the thermal printhead 254 as a printing mechanism to be provided on the carriage 260 include a print wheel and an impact hammer in the case of an impact printer.

Figure 14:
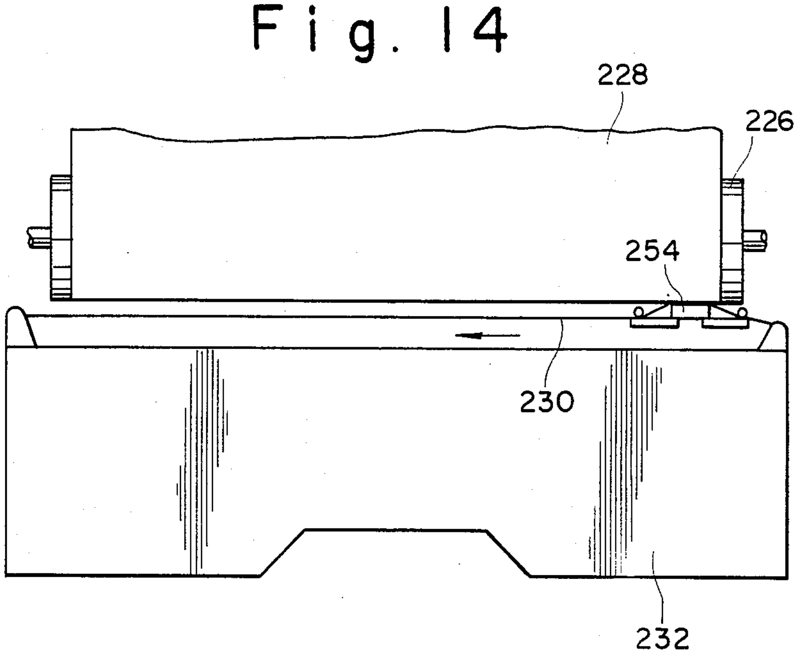
FIG. 14 is a schematic illustration showing the condition in which the carriage 254 has moved to the print end position of printing path for the carriage 254.

As previously described, the carriage 260 carrying thereon the thermal printhead 254 is moved along the platen 226 in a reciprocating manner as guided by the guide rod 262. When the carriage 260 moves from left to right or in the forward direction, the thermal printhead 254 causes the ink of ribbon 230 to be transferred to the recording sheet 228 selectively to carry out printing. While the carriage 260 moves in the forward direction, the ribbon 230 remains still and is not advanced in the direction indicated by the arrow. However, when the carriage 260 has arrived at the right end of travel along the platen roller 226 as shown in FIG. 14, the thermal printhead 254 is moved to be separated away from the platen roller 226 and then advanced leftward until it reaches its initial position, during which the ink ribbon 230 is also advanced in the direction indicated by the arrow in FIG. 14 so that the ink ribbon 230 is advanced over a distance corresponding to a single print line.

Figure 15:
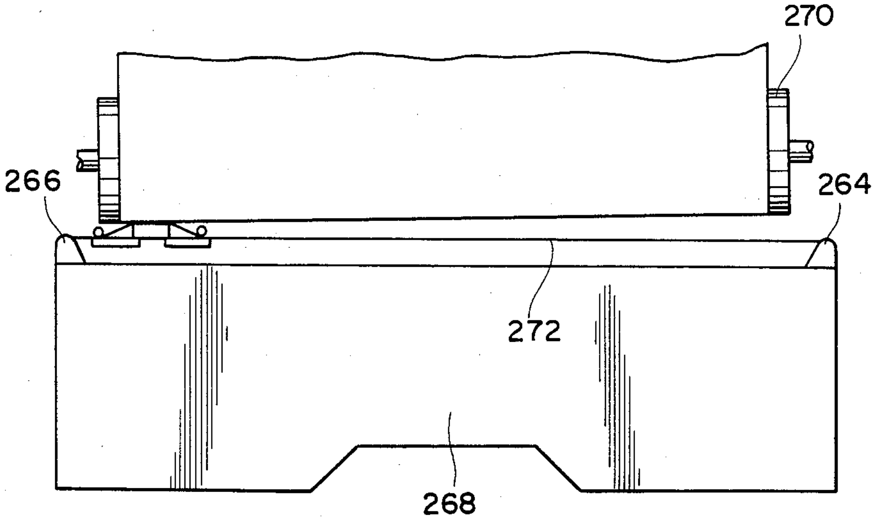
FIG. 15 is a schematic illustration showing a further embodiment of the present invention.

FIG. 15 shows another embodiment of this aspect of the present invention. In the previous embodiment shown in FIG. 11, the ink ribbon cassette 232 whose supply projection 246 of length h is shorter than its take-up projection 248 is placed in parallel with the platen roller 226, so that, when the carriage 260 is located at the initial position, the ribbon 230 extending between the two projections 246 and 248 is inclined with respect to the platen roller 226 such that the ribbon 230 is separated farther away from the take-up projection 248 to the supply projection 246. On the other hand, in the embodiment shown in FIG. 15, an ink ribbon cassette 268 has a supply projection 264 and a take-up projection 266 which are of the same height, but the cassette 268 itself is inclined with respect to the platen roller 270 when mounted on the machine frame, so that its ink ribbon 272 extends along the platen roller in a manner gradually separating farther away from the platen roller 270 in the forward direction or from take-up projection 266 to supply projection 264.

In the two embodiments described above, the ink ribbons 230 and 272 are housed in the ribbon cassettes 232 and 268, respectively. It is to be noted however that this aspect of the present invention should not be limited to the case in which an ink ribbon is housed in a cassette and the present invention is also applicable to the case without a cassette, in which both of supply and take-up spools are rotatably supported on the machine frame and an ink ribbon is extended along a platen roller as extending between the spools. Furthermore, in accordance with the present invention, it is not by all means necessary to have the ink ribbon extended along the platen roller over its full length. The present invention is also applicable to the case in which the ink ribbon is extended along the platen roller partly over its entire length.

Figure 16:
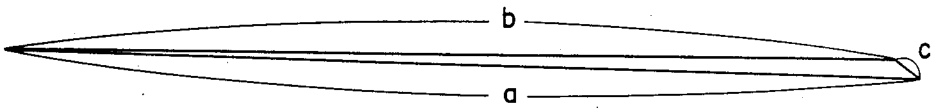
FIG. 16 is a schematic illustration which is useful for explaining the operation of the structure shown in FIG. 11.

As described above, in accordance with this aspect of the present invention, an ink ribbon is so extended along the platen roller to be separated farther away from the platen roller in the forward or printing direction, so that the ink ribbon is brought under tension and slightly pulled out of the supply spool as the carriage moves in the forward direction. Described more in detail in this respect with particular reference to FIG. 16, when the carriage 260 is initially located at its home position or leftmost end of travel as shown in FIG. 11, the ink ribbon 230 extends obliquely with respect to the platen roller 226 so that its length is a as shown in FIG. 16. Upon completion of printing of a single line, the carriage 260 reaches the rightmost end of travel as shown in FIG. 14, the ribbon 230 becomes oriented to be in parallel with the platen roller 226 so that the total length of the exposed portion of ribbon 230 becomes a sum of length b and c. Since the take-up spool 238 is prevented from executing reversed rotation, the ribbon is newly pulled out of the cassette by the amount of $(b+c)-a$. Therefore, in accordance with this aspect of the present invention, even if there is produced a slack in the ribbon 230 during printing, it will be eliminated because the ribbon 230 is gradually set under tension as printing proceeds, thereby allowing to improve the quality of print. Besides, since the ribbon 230 is inclined to be farther away from the platen roller from left to right, even if a new sheet of recording paper is inserted with the carriage 260 located at the home position, it will be less likely to become engaged with the ink ribbon 230 since the gap between the ink ribbon 230 and the platen roller 226 becomes larger from left to right.

A still further aspect of the present invention will now be described with reference to FIGS. 17–21. In accordance with this aspect of the prevent invention, there is provided a printer system capable of carrying out printing on plain paper using a heat-sensitive ink ribbon or directly on heat-sensitive paper selectively, in which mode of operation is automatically selected depending on presence and absence of the ink ribbon.

Figure 17:
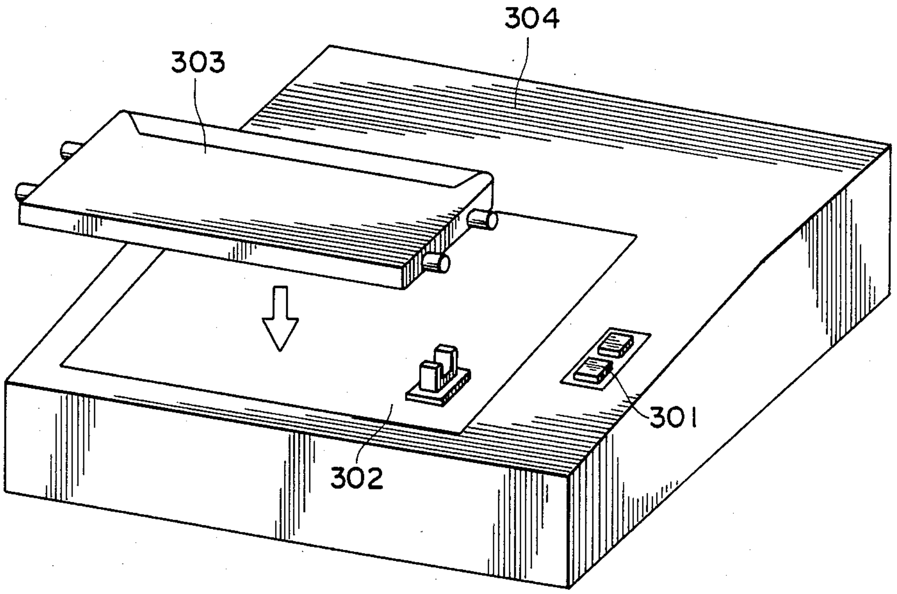
Fig. 17 Prior Art
FIG. 17 is a perspective view showing a prior art printer system in which an ink ribbon cassette 303 may be detachably mounted and which can carry out printing either with or without the cassette 303 depending on whether recording paper is heat-sensitive or not.

FIG. 17 shows a typical prior art thermal printer which can effect printing on plain paper using a heat-sensitive ink ribbon or directly on heat-sensitive paper selectively. As shown, the printer is provided with a selector switch 301 for selecting the mode of operation and with a ribbon end sensor 302 for detecting the end of ink ribbon which is supplied from a supply spool to a take-up spool mounted inside of an ink ribbon cassette 303. As described previously, the cassette 303 may be detachably mounted in a printer main body 304. In such a prior art system, the selector switch must be operated manually to set up an appropriate mode of operation depending on the kind of recording paper used, plain or heat-sensitive. This is quite inconvenient for the operator because he or she must pay attention to the kind of recording paper in use at all times.

Figure 18:
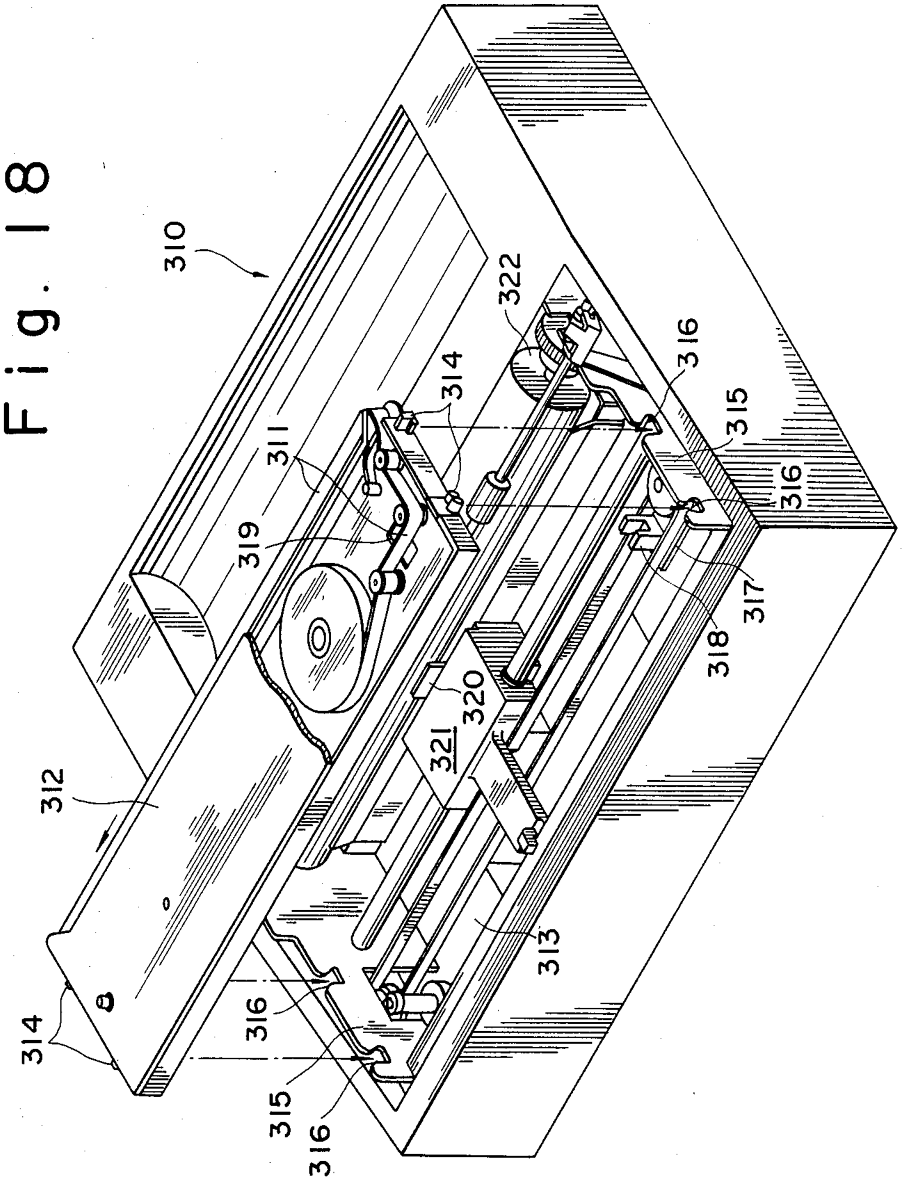
FIG. 18 is a perspective view showing a thermal printer capable of carrying out printing either with plain paper or with heat-sensitive paper constructed in accordance with one embodiment of the present invention.

In accordance with this aspect of the present invention, there is provided a thermal printer capable of carrying out printing selectively either with plain recording paper or heat-sensitive recording paper, which is so structured that a single ribbon end sensor is used not only for detecting the end of ink ribbon but also for switching the mode of operation automatically. FIG. 18 shows a dual mode thermal printer 310 capable of carrying out printing either with plain recording paper or with heat-sensitive recording paper selectively constructed in accordance with one embodiment of this aspect of the present invention. As shown, an ink ribbon cassette 312 containing therein a roll of heat-sensitive ink ribbon 311 stored as wound around a supply spool as described previously may be detachably mounted in a printer main body 313. Similarly with the previous embodiments, the cassette 312 is provided with engaging projections 314 on both sides thereof, which may be brought into engagement with engaging notches 316 formed on top of a frame 315 of printer main body 313 by pressing the cassette 312 downward from above when the cassette 312 is to be mounted in position. On the other hand, when the cassette 312 is to be detached, the engaging projections 314 are easily disengaged from the engaging notches 316 by pulling the cassette 312 upward by grabbing it.

The cassette 312 is provided with an opening 319 at its bottom and in the path where the ink ribbon 311 unwound from the supply spool is lead to a supply port of the cassette 312. On the other hand, a ribbon end sensor 318 is fixedly mounted on the frame 317 of printer main body 313 corresponding in position to the opening 319 of the cassette 312. Thus, when the cassette 312 is mounted in position by bringing its engaging projections 314 into engagement with the engaging notches 316, the ribbon end sensor 318 extends into the interior of cassette 312 through the opening 319 to be located close to the ink ribbon 311 unwound from the supply spool. Under the condition, presence and absence of ink ribbon 311 can be detected by the sensor 318. In the illustrated embodiment, the ribbon end sensor 318 includes a light emitting element, such as LED, and a light receiving element, such as photodiode or phototransistor, which are arranged opposed to each other with the ink ribbon 311 inbetween, so that presence and absence of ribbon 311 can be detected optically.

As also shown in FIG. 18, the printer 310 is provided with a thermal printhead 320 as carried on a carriage 321 which is slidably supported on a guide shaft which extends in parallel with a platen roller 322, so that the thermal printhead 320 may be moved along the platen roller 322 in a reciprocating manner.

Figure 19:
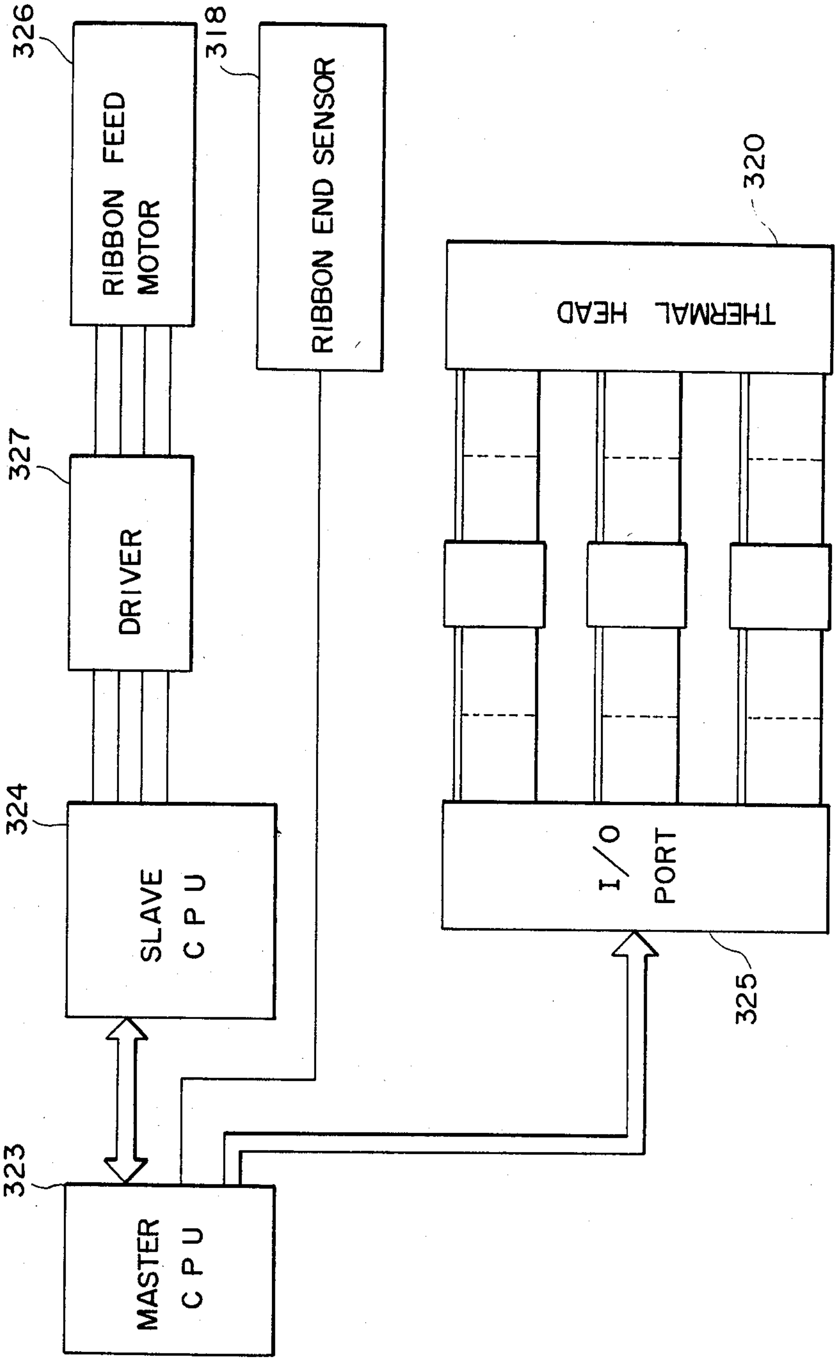
FIG. 19 is a block diagram showing the overall structure of a ribbon end sensing system provided in the printer of FIG. 18.

FIG. 19 shows in block form a control system for controlling the operation of the ribbon end sensor 318, which is provided in the printer main body 313. When a power switch (not shown) of the printer 310 is turned on, a master CPU 323 checks an input signal from the ribbon end sensor 318 and if the received input signal indicates the presence of ink ribbon 311, the master CPU 323 establishes a mode of printing operation using the ink ribbon 311. On the other hand, if the input signal from the sensor 318 indicates the absence of ribbon 311, then the master CPU 323 establishes another mode of printing operation without the ink ribbon 311.

Then, the master CPU 323 supplies the thus established status to a slave CPU 324 to be also stored therein. Under the condition, when the master CPU 323 receives a print signal, it checks the mode of printing operation established and stored therein and if the established mode of operation is the printing using ink ribbon 311, the master CPU 323 determines a time period for applying heat to the ribbon 311 in printing and supplies the thus determined time period in the form of a pulse to the thermal printhead 320 through an I/O port 325, so that printing is carried out on plain paper by having the ink of ink ribbon 311 selectively transferred to the paper depending on the heat pattern produced on the thermal printhead 320. As described previously, the ink ribbon 311 is held stationary during printing, i.e., while the carriage 321 moves from left to right. During returning of carriage 321, or while the carriage 321 moves from right to left, the slave CPU 324 checks the status of ribbon 311 and sends a driving signal to a driver 327 to have a ribbon feed motor 326 driven thereby causing the ribbon 311 to advance, so that the used portion of ribbon 311 is fed into the cassette 312.

On the other hand, in the case of printing without using the ink ribbon 311, the ribbon end sensor 318 sends a signal indicating the absence of ribbon 311 to the master CPU 323, so that a status indicating the mode of printing operation without the ink ribbon 311 is set in the master CPU 323. Under the condition, in response to a print signal supplied, the master CPU 323 determines a time period for application of heat and the determined time period is supplied in the form of a pulse to the thermal printhead 320 through the I/O port 325. This printing operation is carried out while the carriage 321 moves in the forward or printing direction. Upon completion of printing a single line, the carriage 321 starts to move in the backward direction, during which the slave CPU 324 maintains the ribbon feed motor 326 inoperative.

Figure 20:
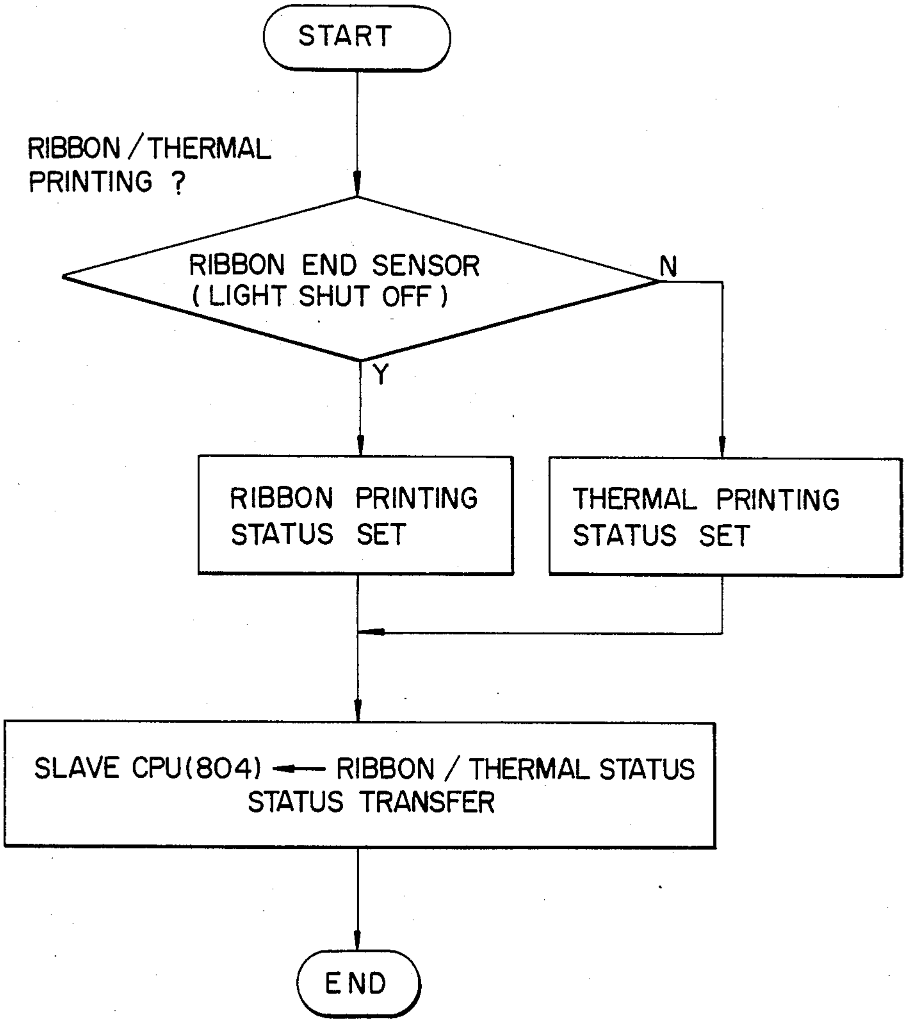
FIG. 20 is a flow chart showing the sequence of steps which follow upon power up in the printer of FIG. 18.
Figure 21:
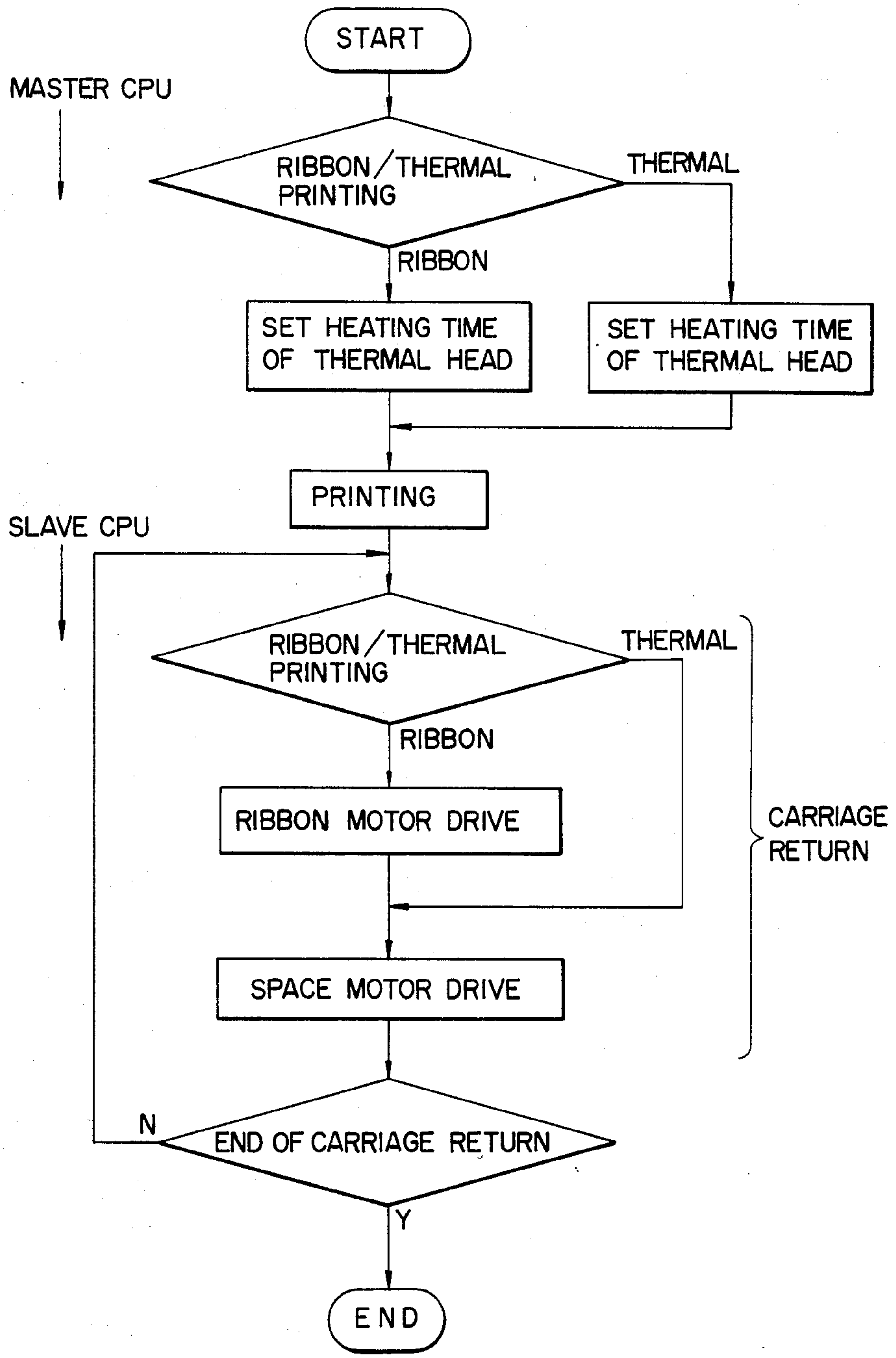
FIG. 21 is a flow chart showing the sequence of steps how printing is carried out in the printer of FIG. 18.

FIG. 20 shows the sequence of steps which illustrate how the mode of operation, ribbon printing using ribbon 311 or thermal printing without using ribbon 311, is established depending on whether the sensing light at the ribbon end sensor 318 is intercepted by the ribbon 311 or not after power up. FIG. 21 shows the sequence of steps how printing is carried out after establishment of mode of printing operation.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A printing system comprising:

a platen for placing thereon a recording medium;

supporting means for supporting a part of a printing ribbon extending between a pair of first and second positions which are fixed with respect to said platen, such that said part of the ribbon is inclined with respect to said platen and said part of printing ribbon between said pair of first and second positions is gradually separated farther away from said platen in a first direction; and a carriage supported to be movable along said platen in a reciprocating manner, said carriage having mounted thereon a printing divice which effects printing on said recording medium using said printing ribbon while said carriage moves in said first direction and which does not effect printing while said carriage moves in a second direction which is opposite to said first direction.

2. The system of claim 1 wherein said supporting means includes a supply spool having a supply of said printing ribbon wound therearound and a take-up spool for having said printing ribbon wound therearound after having been used, and said carriage is provided with guide means for guiding said printing ribbon between said printing device and said recording medium.

3. The system of claim 2 wherein said supporting means includes an ink ribbon cassette, in which said supply and take-up spools are housed, said cassette being detachably mounted in position in said system.

4. The system of claim 3 wherein said cassette is provided with a first projection having a tip end through which said printing ribbon is lead out of said cassette and with a second projection, whoes height is greater than that of said first projection and which has a tip end through which said printing ribbon is lead into said cassette after having been used, wherein said cassette is parallel with said platen when mounted in position and said part of the printing ribbon extending along said recording medium is separated from the platen by a greater distance at said first projection than at said second projection.

5. The system of claim 3 wherein said cassette is provided with a first projection which has a tip end through which said printing ribbon is lead out of said cassette and with a second projection, whose height is identical to the height of said first projection and which has a tip end through which said printing ribbon is lead into said cassette after having heen used, wherein said cassette is inclined with respect to said platen when mounted in position such that said part of printing ribbon extending along said recording medium is separated from the platen by a greater distance at said first projection than at said second projection.

6. The system of claim 4 wherein said first projection is a supply projection and said second projection is a take-up projection.

7. The system of claim 5 wherein said first projection is a supply projection and said second projection is a take-up projection.

8. The system of claim 4 wherein the tip end of said first projection corresponds to said first position and the tip end of said second projection corresponds to said second position.

9. The system of claim 5 wherein said tip end of said first projection corresponds to said first position and the tip end of said second projection corresponds to said second position.

10. The system of claim 1 wherein said printing ribbon is held stationary when said carriage moves in said first direction and said printing ribbon is moved over a predetermined distance when said carriage moves in said second direction.

11. The system of claim 10 wherein an unused portion of said printing ribbon is set between said pair of first and second positions when said printing ribbon is moved over said predetermined distance while said carriage moves in said second direction.

12. The system of claim 11 wherein said printing ribbon is pressed against said recording medium by said printing device while said carriage moves in said first direction and said printing ribbon is kept separated away from said recording medium when said carriage moves in said second direction.

13. The system of claim 12 wherein said printing device is a thermal printhead.

14. The system of claim 4 wherein said first and second projections are provided at ends of said cassette which are spaced from each other along said first direction.

15. The system of claim 14 wherein said first and second projections project toward said platen from said cassette.

16. The system of claim 15 wherein said cassette includes:

a case means for housing therein said supply spool, said case means being provided with a supply port through which said printing ribbon is lead out of said case means and with an opening, and said case means having an inner surface; and an electrically conductive layer having a first portion formed on at least a part of said inner surface of said case means and a second portion extending out of said case means through said opening, said system having a contact member which is electrically connected to a predetermined potential, and said second portion of the conductive layer being brought into contact with said contact member when said cassette is set in position.

17. The system of claim 16 wherein said predetermined potential is ground potential.

18. The system of claim 16 wherein said case means includes a bottom case generally in the shape of a rectangular tray and a top cover which may be placed on said bottom case for closure, said bottom case being provided with said opening.

19. The system of claim 18 wherein said case means further includes a take-up port through which said printing ribbon is lead into said case means to be wound around said take-up spool after having been unwound from said supply spool and lead out of said case means through said supply port.

20. The system of claim 19 wherein said bottom case has an outer surface and said second portion of said electrically conductive layer is fixedly attached to said outer surface of said bottom case.

21. The system of claim 20 wherein said contact member is springy.

22. The system of claim 16 wherein said printing ribbon is heat-sensitive ink ribbon.

23. The system of claim 18 wherein said system includes a ribbon end sensor for detecting the end of said printing ribbon, and wherein when said cassette is in position in the system said opening is in registry with said ribbon end sensor such that said sensor extends into the interior of said case means through said opening when said cassette is set in position.

* * * * *